(12) United States Patent
Stevens et al.

(10) Patent No.: US 10,137,646 B2
(45) Date of Patent: Nov. 27, 2018

(54) PREPARING A POLYGON MESH FOR PRINTING

(71) Applicant: Whispering Gibbon Limited, Newcastle-upon-Tyne (GB)

(72) Inventors: Joseph Paul Stevens, Hexham (GB); David John McKenna, Newcastle-upon-Tyne (GB)

(73) Assignee: Whispering Gibbon Limited, Newcastle-upon-Tyne (GB)

( * ) Notice: Subject to any disclaimer, the term of this patent is extended or adjusted under 35 U.S.C. 154(b) by 0 days.

(21) Appl. No.: 15/204,151

(22) Filed: Jul. 7, 2016

(65) Prior Publication Data

US 2017/0015057 A1    Jan. 19, 2017

(30) Foreign Application Priority Data

Jul. 13, 2015  (GB) .................................. 1512304.5

(51) Int. Cl.
| | |
|---|---|
| *G06T 17/00* | (2006.01) |
| *B29C 67/00* | (2017.01) |
| *B29C 64/386* | (2017.01) |
| *B33Y 50/02* | (2015.01) |

(52) U.S. Cl.
CPC ........ *B29C 67/0088* (2013.01); *B29C 64/386* (2017.08); *B33Y 50/02* (2014.12)

(58) Field of Classification Search
None
See application file for complete search history.

(56) References Cited

U.S. PATENT DOCUMENTS

| | | | | |
|---|---|---|---|---|
| 6,373,487 | B1 * | 4/2002 | Culbertson | G06T 17/00 345/424 |
| 6,990,228 | B1 * | 1/2006 | Wiles | G06T 17/10 345/419 |
| 8,463,024 | B1 * | 6/2013 | Gallup | G06T 7/596 345/420 |
| 2003/0160787 | A1 * | 8/2003 | Buehler | G06T 15/06 345/421 |
| 2005/0154481 | A1 * | 7/2005 | Berger | G06T 19/20 700/98 |

(Continued)

FOREIGN PATENT DOCUMENTS

CN           103617603 A       3/2014

OTHER PUBLICATIONS

Payne et al., Distance Field Manipulation of Surface Models, Jan. 1992, IEEE Computer Graphics and Applications, pp. 65-71.*

*Primary Examiner* — Anh-Tuan V Nguyen
(74) *Attorney, Agent, or Firm* — Richard M. Goldberg

(57) ABSTRACT

A computer-implemented method of preparing a polygon mesh for printing by a process of additive manufacturing includes the steps of receiving a model of an object to be printed in the form of a polygon mesh, converting the polygon mesh into a signed distance field which comprises voxels identified as interior or exterior to the object, the conversion including a process for resolving degeneracies in the model so that the signed distance field defines an outer surface that is an orientable manifold, and thus may exist in reality and an output step which converts the signed distance field to a format that facilitates additive manufacturing of the object.

18 Claims, 20 Drawing Sheets

(56) References Cited

U.S. PATENT DOCUMENTS

| | | | | |
|---|---|---|---|---|
| 2011/0087350 | A1* | 4/2011 | Fogel | G06F 17/50 |
| | | | | 700/98 |
| 2011/0205583 | A1* | 8/2011 | Young | B29C 67/0088 |
| | | | | 358/1.15 |
| 2012/0224755 | A1* | 9/2012 | Wu | G06T 17/00 |
| | | | | 382/131 |
| 2013/0297059 | A1 | 11/2013 | Grifith et al. | |
| 2014/0052415 | A1* | 2/2014 | Baran | G06F 17/50 |
| | | | | 703/1 |
| 2014/0140601 | A1* | 5/2014 | Litvin | G06T 11/005 |
| | | | | 382/131 |
| 2014/0172377 | A1* | 6/2014 | Taubin | G06T 17/00 |
| | | | | 703/1 |
| 2014/0324211 | A1* | 10/2014 | Sullivan | G05B 19/4097 |
| | | | | 700/182 |
| 2015/0104101 | A1* | 4/2015 | Bryant | G06T 7/0051 |
| | | | | 382/171 |
| 2015/0279091 | A9* | 10/2015 | Dionne | G06T 15/04 |
| | | | | 345/420 |
| 2015/0370926 | A1* | 12/2015 | Savage | G06F 17/50 |
| | | | | 703/1 |
| 2016/0096318 | A1* | 4/2016 | Bickel | B29C 67/0051 |
| | | | | 264/40.1 |
| 2016/0180528 | A1* | 6/2016 | Reynolds | G06T 7/11 |
| | | | | 382/128 |
| 2016/0185045 | A1* | 6/2016 | Linnell | B29C 67/0088 |
| | | | | 264/401 |
| 2016/0301910 | A1* | 10/2016 | Lucas | H04N 13/0271 |
| 2017/0053438 | A1* | 2/2017 | Huang | G06T 17/20 |

* cited by examiner

PREPARING A POLYGON MESH FOR PRINTING

CROSS REFERENCE TO RELATED APPLICATIONS

This application claims priority from United Kingdom patent application number 15 12 304.5, filed on Jul. 13, 2015, the entire disclosure of which is incorporated herein by reference in its entirety.

BACKGROUND OF THE INVENTION

The present invention relates to the preparation of a polygon mesh for printing by a process of additive manufacturing.

Additive manufacturing, also known as 3D printing, has over recent years become increasingly mass-market, with 3D printers being readily obtainable for home and educational use. In addition, commercial 3D printing has extended to production of one-off objects, based on user-provided 3D models. These 3D models are typically produced in CAD software and output as a STL file. The STL file tends to be converted into G-code, which is a numerical control programming language which can instruct a 3D printer to manufacture the object.

It is therefore an object of the present invention to provide a method whereby a 3D model created by a user can be converted into a form suitable for 3D printing. However, problems are encountered because the 3D model a user wishes to print, whilst appearing on screen to be realistic, is often not physically realizable. Indeed, one aim of the present invention is to process a 3D video game asset so that it may be printed. Such assets are optimized for real-time rendering, such as by a video game engine. This means that it is not a requirement for the renderer to be provided with a closed orientable manifold (i.e. an object that can actually be printed) in order for rasterization to be completed. Indeed, a single polygon may be rendered, even though objects having zero thickness are impossible in reality.

Methods are therefore required for suitable processing of 3D models which may have degeneracies which prevent them from being produced outside of a computer program.

BRIEF SUMMARY OF THE INVENTION

The present invention is directed to processes and machines for preparing a polygon mesh for printing by a process of additive manufacturing. The polygon mesh undergoes conversion into a signed distance field, and the process of conversion includes resolving degeneracies in the model so that it is represented in the signed distance field as an outer surface which is an orientable manifold, i.e. it may exist in reality and may therefore be printed using additive manufacturing.

BRIEF DESCRIPTION OF THE DRAWINGS

The invention will now be described by way of example only with reference to the accompanying drawings, of which.

DETAILED DESCRIPTION OF THE INVENTION

FIG. 1

The present invention seeks to solve the above-mentioned problems in the state of the art by providing a processing pipeline for the conversion of 3D meshes into a form that can be printed by additive manufacturing. The pipeline is shown generally in FIG. 1, in which a 3D model of an object in the form of a mesh 101 is to be provided as the input. In the present example the object will be easily recognized by those skilled in the art as a mesh of the Utah teapot, albeit with a major flaw in that it has no defined base. The mesh is therefore not directly printable, and requires a degree of processing before it can be printed by additive manufacturing.

Figure 1:
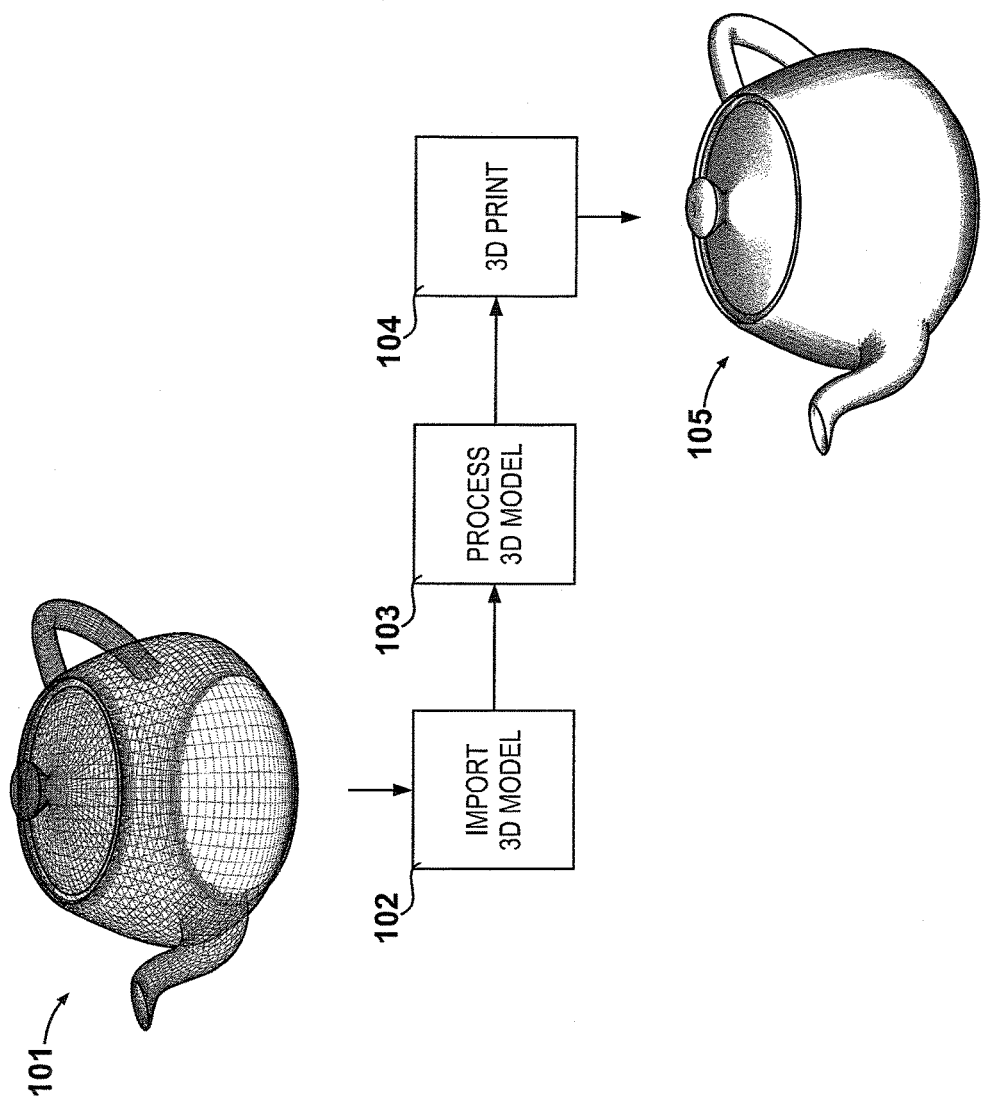
FIG. 1 shows an overview of the present invention's procedure for preparing a polygon mesh for printing.

In addition, the polygons that make up the mesh, which in the example shown in FIG. 1 are quads but could be other primitives such as triangles or patches, form an object which is distinctly angular. These problems are not usually an issue for a 3D object when it is rendered in, say, a videogame engine, due to the rendering pipeline having features such as shading based on vertex normals of the polygons, addition of textures and surface normal mapping to add detail.

The mesh 101 is thus provided to an import stage 102, in which the mesh is loaded for processing along with the material type, normal maps and textures associated with it, if applicable. The imported mesh is then provided to a processing stage 103, comprising processing steps as will be described with reference to the later Figures. Following completion of appropriate processing, the final model is exported to a 3D print process 104 to print the finished object 105 by additive manufacturing.

The present invention is agnostic to the type of additive manufacturing process, and therefore may output suitable files to be provided to extrusion (e.g. fused deposition modelling), granular (e.g. selective laser sintering) and light polymerized (e.g. stereolithography) type printing processes.

FIG. 2

Figure 2:
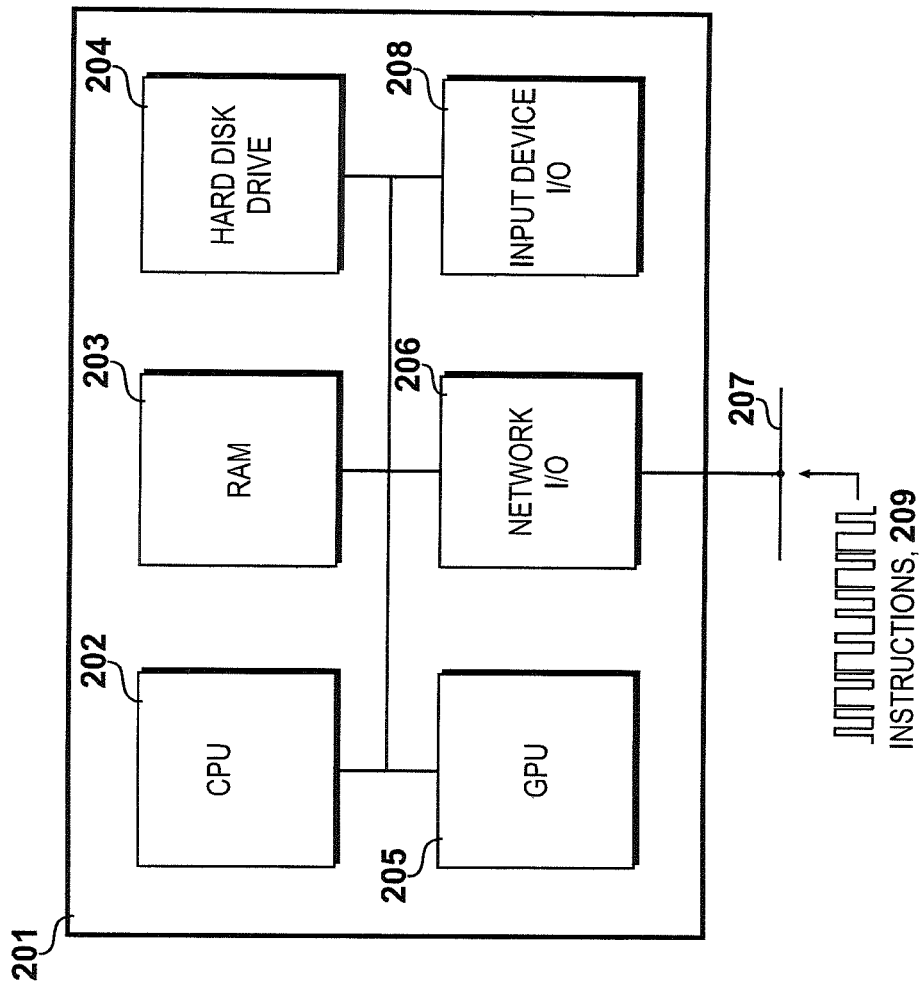
FIG. 2 is an illustration of an apparatus 201 suitable for carrying out the processing according to the present invention.

An apparatus 201 suitable for performing the processing requirements of the present invention is illustrated in FIG. 2. The apparatus 201 has the architecture of a personal computer, which could in an embodiment be a desktop PC or a tablet PC.

The apparatus 201 therefore comprises a processor provided by central processing unit 202. CPU 202 is in this embodiment a quad-core Intel® Core i5 CPU operating at 2.4 gigahertz. Memory is provided by a combination of random access memory 203, which in this embodiment is 4 gigabytes of DDR3 SDRAM, along with a hard disk drive 204, which in this embodiment is a 128 gigabyte solid state disk. A graphics processing unit 205 is also included for acceleration of graphics, particularly the rendering of 3D graphics. A network interface 206 is provided for communication with a local area network 207, and in turn, via a gateway, the Internet. Human interfacing capability is provided by an input device interface 208, such as a Universal Serial Bus®, to allow mice and keyboards to be connected to the apparatus 201. Alternatively, a touch-sensitive display may be provided.

In use, instructions 209 of the present invention for performing the processing of 3D meshes in preparation for 3D printing are therefore obtained via the network interface 206, saved on hard disk drive 204, loaded into RAM 203, and executed by CPU 201.

FIG. 3

An exemplary application of the processing pipeline of the present invention involves its incorporation into a videogame by its provision as a plugin. It is envisaged that this will allow objects to be designated as printable objects by developers, which may then be printed by gamers who obtain the plugin.

Figure 3:
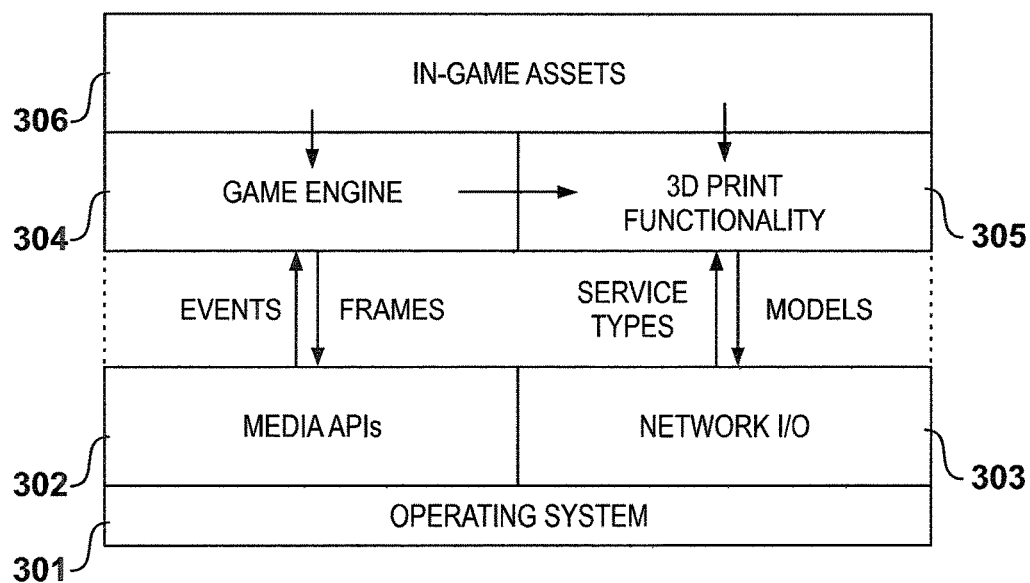
FIG. 3 shows a mapping of instructions in memory in the apparatus 201.

A mapping of instructions in memory on apparatus 201 when running such a configured videogame is therefore shown in FIG. 3. At a base layer, an operating system 301 such as, in the present embodiment, Microsoft Windows® resides and manages all interactions between software and hardware. The operating system 301 reveals various subsystems and application programming interfaces, such as media APIs 302 and networking functionality 303. This allows, in the case of media APIs 302, applications to make use of graphics functionality (GPU 205) and receive inputs from users (input device interface 208), and, in the case of networking functionality 303, to send and receive data (via the network interface 206).

Thus, at the application layer, a game engine 304 for a videogame is located and receives input events from and sends frames for display to the media APIs 302. Alongside the game engine 304 is the 3D print function 305 provided by the instructions 209 of the present invention. In-game assets 306 are held in memory for use by the game engine 304. Upon request by a user, the game engine 304 will invoke the 3D print function 305 to process an in-game asset for output to a printing service. The 3D print function 305 will obtain details of the printing service, namely the type additive manufacturing process, and produce a suitable model for output to it.

FIG. 4

Figure 4:
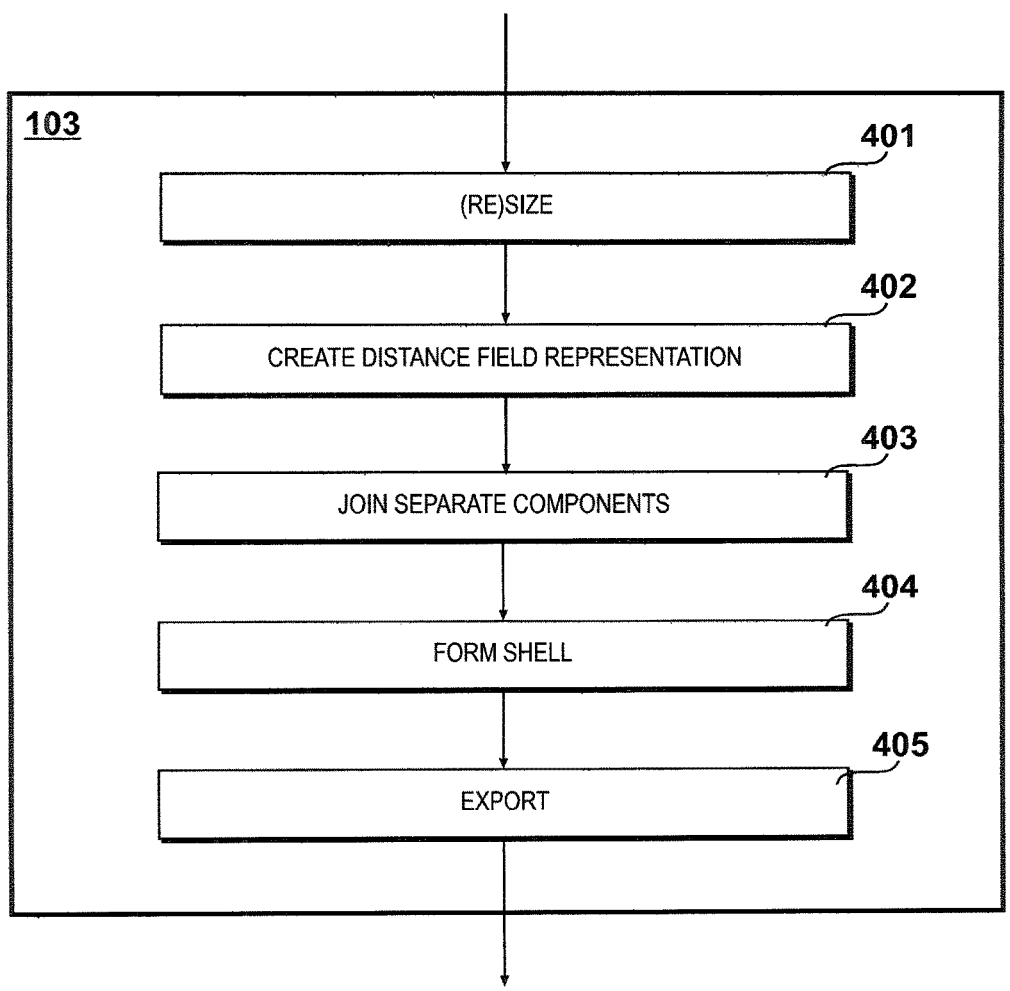
FIG. 4 shows an overview of procedures undertaken during the processing stage 103.

An overview of procedures undertaken during the processing stage 103 is shown in FIG. 4.

At step 401, the imported model is given a real size, or, if the imported model already has a size, it is resized to the real size. The real size may be fixed, or may be specified by a user, and may be capped depending on the target printer.

Following (re)sizing, the mesh of the imported model is processed to create a distance field representation of the mesh at step 402. Distance fields represent objects implicitly, and in the present invention, signed distance fields are created. A signed distance field is a regular sampling of the closest distance to the surface of an object, in which the sample points are identified as voxels whose sign indicates whether they are located interior or exterior to the object. Conventionally, negative values indicate that a voxel is inside the object and positive values indicate that a voxel is outside the object. Step 402 will be expanded upon with reference to FIG. 5.

The creation of the signed distance field utilizing the methods of the present invention solves any degeneracies in the model, such as self-intersections and holes, to create an isosurface that is an orientable manifold. This means that it can exist in reality, and can be printed.

Following the initial creation of the distance field representation of the mesh, in the present embodiment separate components are joined at step 403. Step 403 will be described with reference to FIG. 13.

In the present embodiment, the object represented in the distance field is made into a shell at step 404. This assists with reducing the total amount of material required (and therefore cost) to print the object. Step 404 will be described with reference to FIG. 16. It will be appreciated that step 404 could be omitted should solid objects need to be printed or to reduce processing time, etc.

Finally, the distance field is converted into a suitable output format at step 405. This process will be described further with reference to FIG. 20.

FIG. 5

Figure 5:
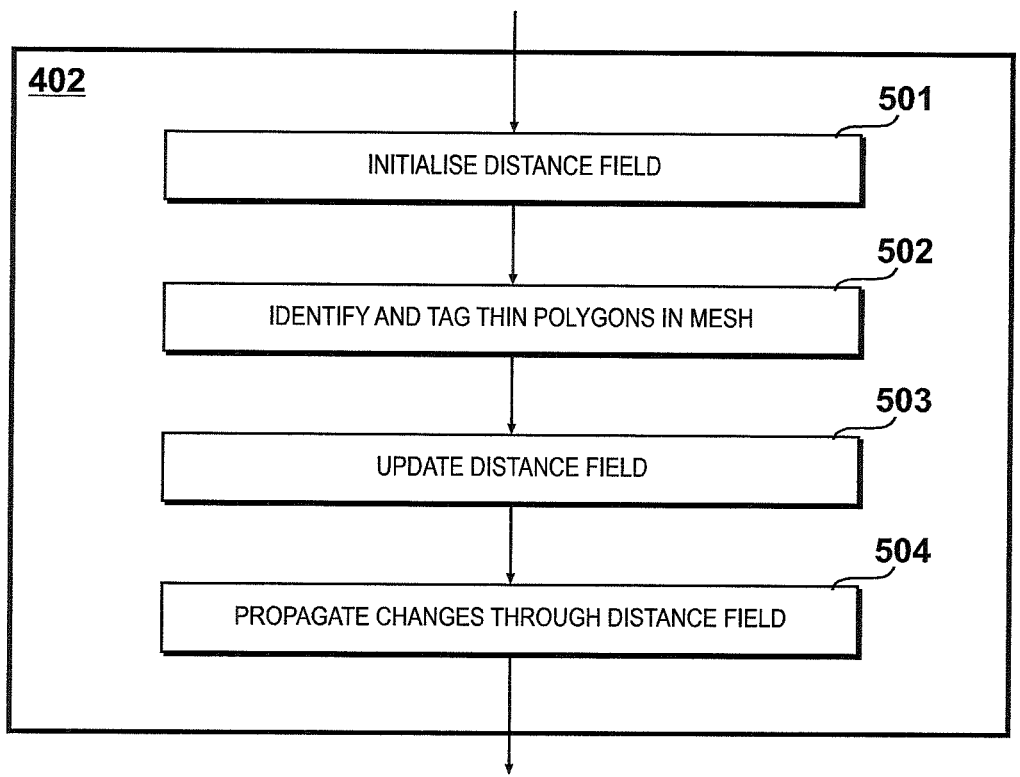
FIG. 5 shows steps carried out during step 402 to create the signed distance field.

Steps carried out during step 402 to create the signed distance field are shown in FIG. 5.

At step 501, the distance field itself is initialized in memory. Step 501 will be described further with reference to FIG. 6.

Figure 7:
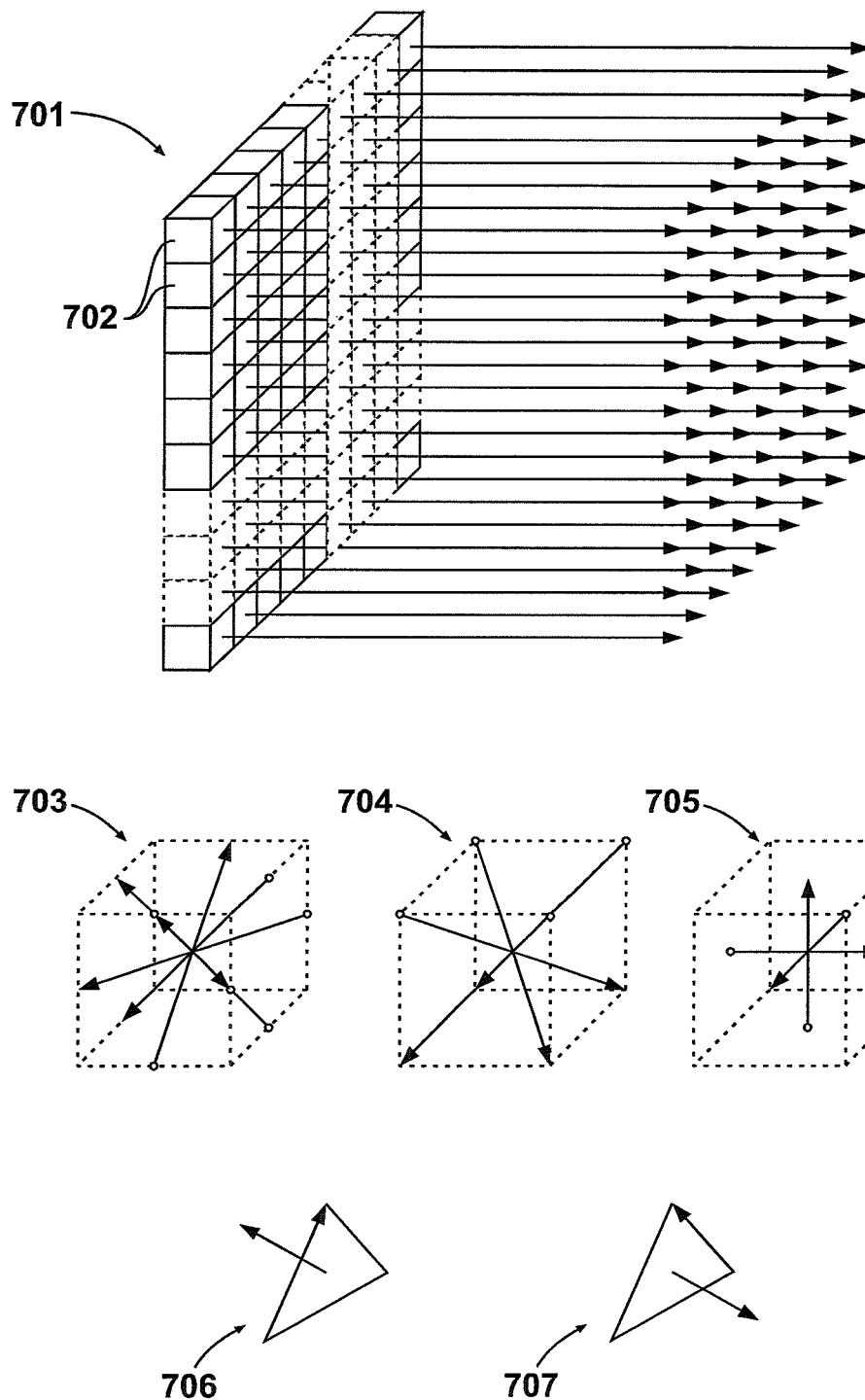
FIG. 7 shows in general how layered depth images are created.

At step 502, polygons deemed "thin" are identified in the mesh and tagged as such. This process involves the creation of layered depth images. An LDI is a view of the scene from a single input camera view, whose pixels store lists identifying polygon intersections along each line of sight. They may be considered as a run-length encoded volume as viewed from a particular orientation. The process of creating LDIs will be described further with reference to FIGS. 7 to 9, and the process of identifying thin polygons will be described with reference to FIG. 10.

The distance field is then updated at step 503. This includes a number of steps, which will be described with reference to FIGS. 11 to 13. Following updates to the distance field, changes that occurred during step 503 are propagated through the entire distance field at step 504. This process will be described with reference to FIG. 14.

FIG. 6

Figure 6:
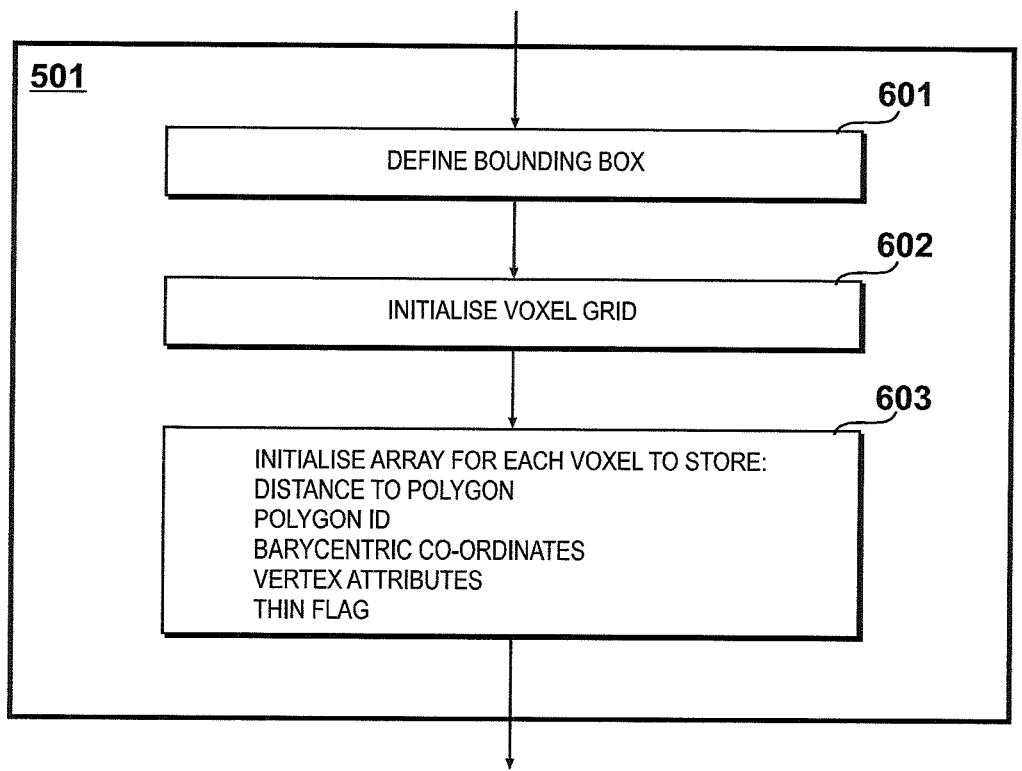
FIG. 6 shows the procedures carried out to initialize the distance field during step 501.

Procedures carried out to initialize the distance field during step 501 are set out in FIG. 6.

At step 601, a bounding box is defined that will envelop the mesh. The bounding box may be a cube or a cuboid. At step 602, a voxel grid is initialized within the bounding box. For a cube a voxel grid of 512×512×512 has been found to provide the required accuracy, but for small models fewer voxels may be required, and for larger models clearly a greater number may be required to give the necessary spatial resolution and to avoid sampling errors, etc. The voxel grid represents a regular sampling of the volume within the bounding box.

Each voxel is then assigned an array at step 603 to store various parameters. First, a field for the distance to the nearest polygon is provided. Second, a field for recording the identifier of that polygon is included. A field is also provided to record the barycentric co-ordinates of the nearest point on that polygon. The attributes of the vertices making up the polygon are also stored, such as normals, color and texture co-ordinates. Finally, a field is provided in the array for a thin flag to be set.

FIG. 7

As described previously with reference to FIG. 6, the process of identifying what is termed herein "thin" polygons involves, first, the creation of layered depth images. In the present embodiment, this involves the initialization of a set of points from which to cast rays through the mesh, as shown at 701 in FIG. 7. Each pixel 702 of the layered depth image is a list that records the distance travelled to the intersection with a polygon in the mesh, and the orientation of that polygon.

LDIs are created in the present embodiment from 13 different orientations through the mesh, based on a cube's axes of symmetry. Six are $C_2$ (axes joining midpoints of opposite edges) as shown at 703, four are $C_3$ (space diagonals) as shown at 704, and three are $C_4$ (axes joining opposite face centroids) as shown at 705.

The orientation of a polygon is determined by its winding, i.e. the directionality of its vertices. Thus, in the present embodiment, an anticlockwise winding as shown at 706 is considered as facing the opposite direction to a clockwise winding at 707. It does not matter which winding represents outward and inward facing, as long as it is consistent in the mesh.

FIG. 8

Figure 8:
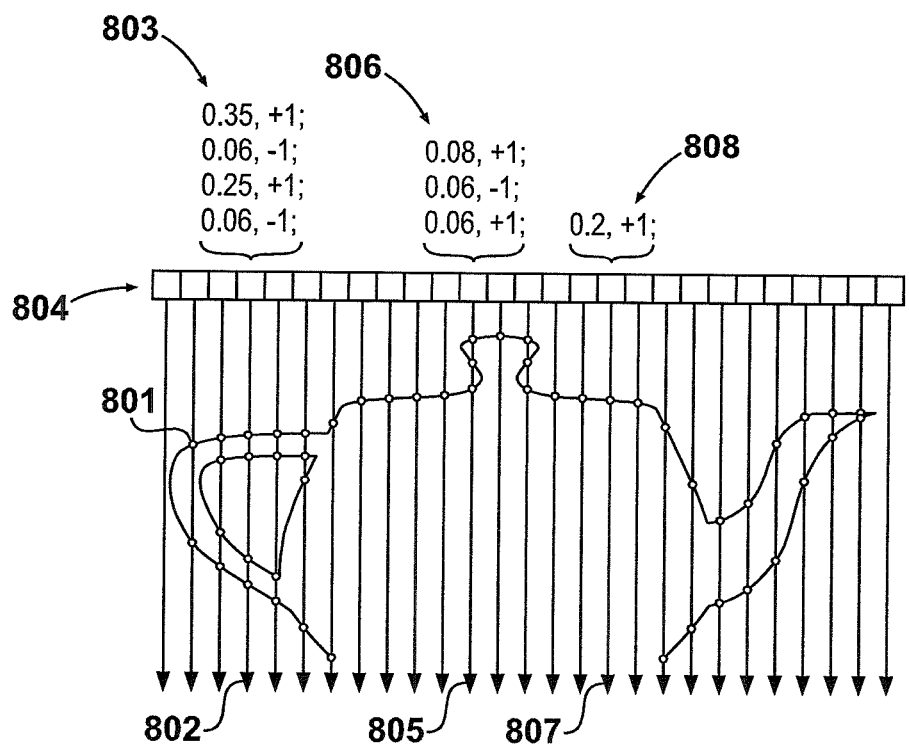
FIG. 8 shows an example of the generation of a row of pixels for a layered depth image from a first orientation.

An example of the generation of a row of pixels for a layered depth image from a first orientation is shown in FIG. 8. The mesh 101 is shown undergoing a ray tracing operation, in which intersections 801 of the rays with the mesh are identified.

A ray 802 generates a list 803 which identifies, first, the distance from the projection plane 804 to the first intersection with the mesh. This distance is, in the present embodiment, expressed as a fraction of the total length of the ray through the bounding box around the mesh 101. Along with the distance, the orientation of the polygon is recorded. In this example the first polygon is encountered at a depth of 0.35, and is oriented against the ray. In the present example, the orientation of the polygon is ascertained by taking the sign of the dot product of the ray's unit vector and the surface normal of the polygon.

Another ray 805 records a list 806 that only contains three entries, two indicating polygons orientated against the ray and one with the ray. This is because, as described previously, the mesh contains a defect in that there is no defined base. Another ray 807 records a list 808 with only one entry after intersection with only one polygon.

FIG. 9

Figure 9:
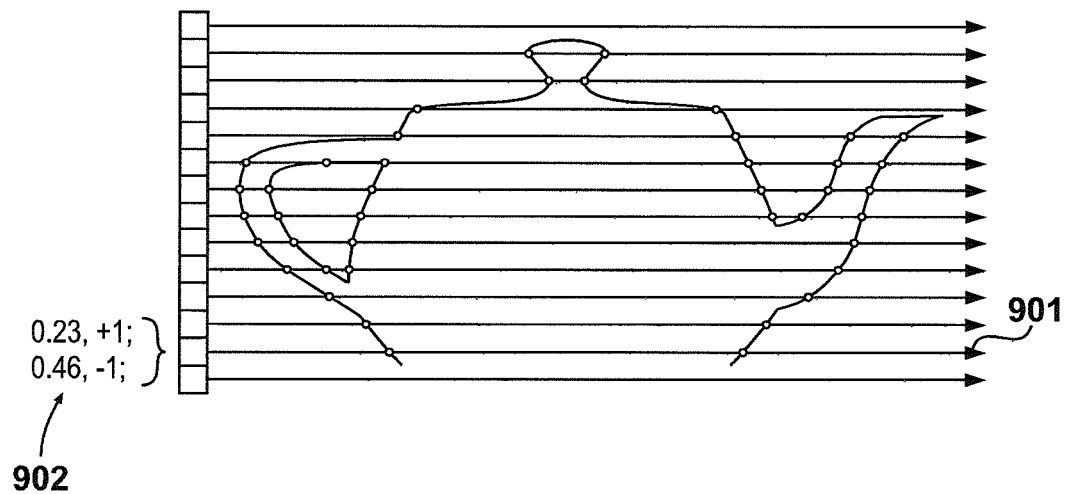
FIG. 9 shows an example of the generation of a row of pixels for a layered depth image from a second orientation.

The generation of a second layered depth image from a second orientation is shown in FIG. 9. In this example, a ray 901 records a list 902 which clearly identifies that the ray intersected a first polygon oriented against the ray followed by a second polygon oriented with the ray. This implies that the ray entered an object and exited it. Obtaining layered depth images from the thirteen directions identified in FIG. 7, coupled with this inference, assists with determining the true volume within the mesh and assists in the resolving of degeneracies in the mesh. Alternative methods for creating layered depth images, such as depth peeling, could also be used.

FIG. 10

Figure 10:
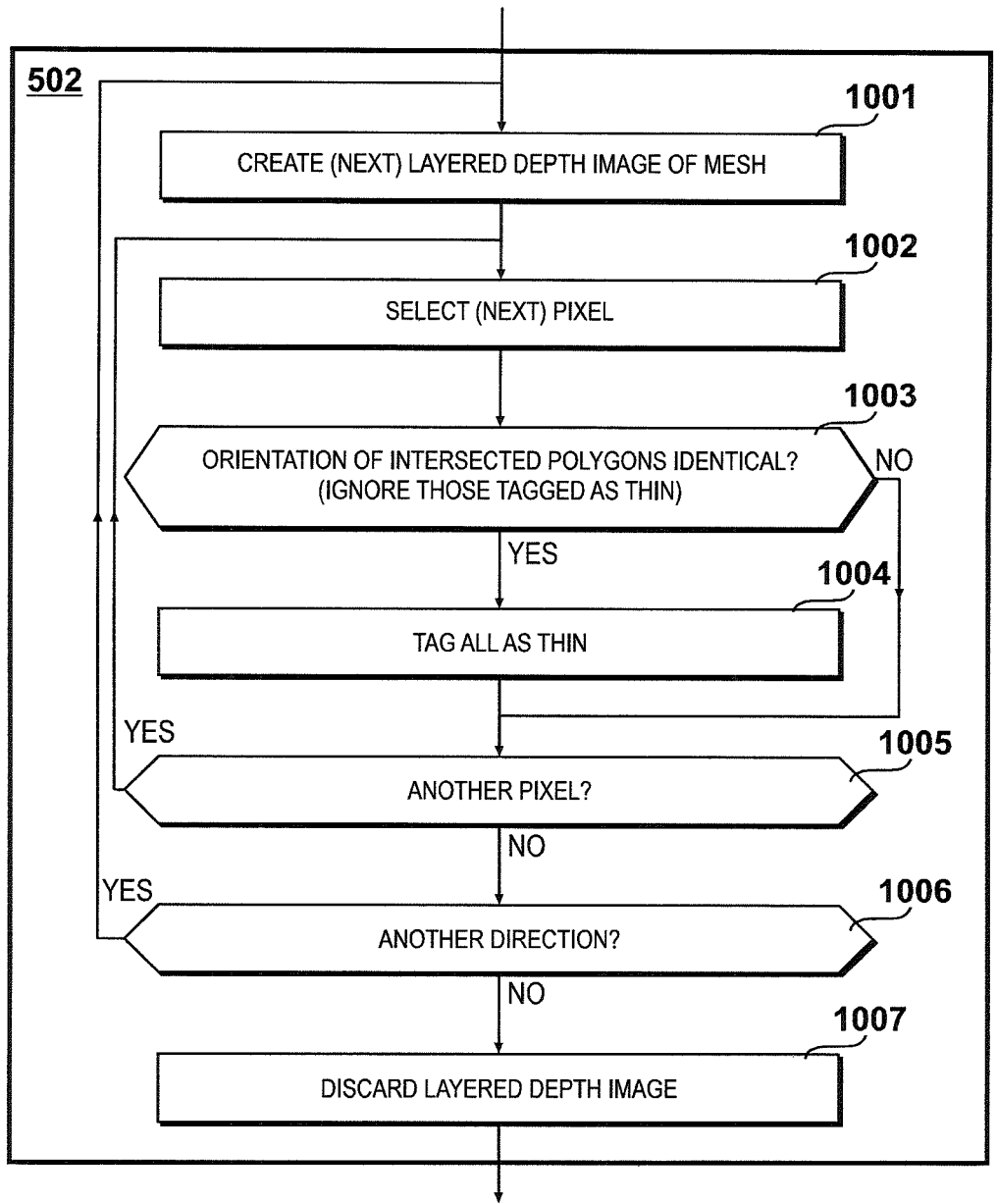
FIG. 10 shows procedures carried out to tag polygons as thin during step 502.

Procedures carried out to tag polygons as thin during step 502 are set out in FIG. 10.

At step 1001, a layered depth image is created from one of the thirteen defined directions. The first pixel is then selected for analysis at step 1002, and at step 1003 a question is asked as to whether the orientations of the intersected polygons in the pixel's list are identical (ignoring any that are already tagged as thin). If answered in the affirmative, as would be the case with list 808, then control proceeds to step 1004 where all of the polygons in the mesh that were identified in the list are tagged as thin. Then, or if the question asked at step 1003 was answered in the negative as would be the case with lists 803 and 806, a question is asked at step 1005 as to whether there is another pixel in the current LDI to consider. If so, control returns to step 1002 until all pixels have been processed whereupon a question will be asked at step 1006 as to whether there is another direction to consider. If so, control returns to step 1001 until the loop has been completed, in the present case, thirteen times. In the present implementation, the layered depth images are then discarded to aid with garbage collection etc.

FIG. 11

Figure 11:
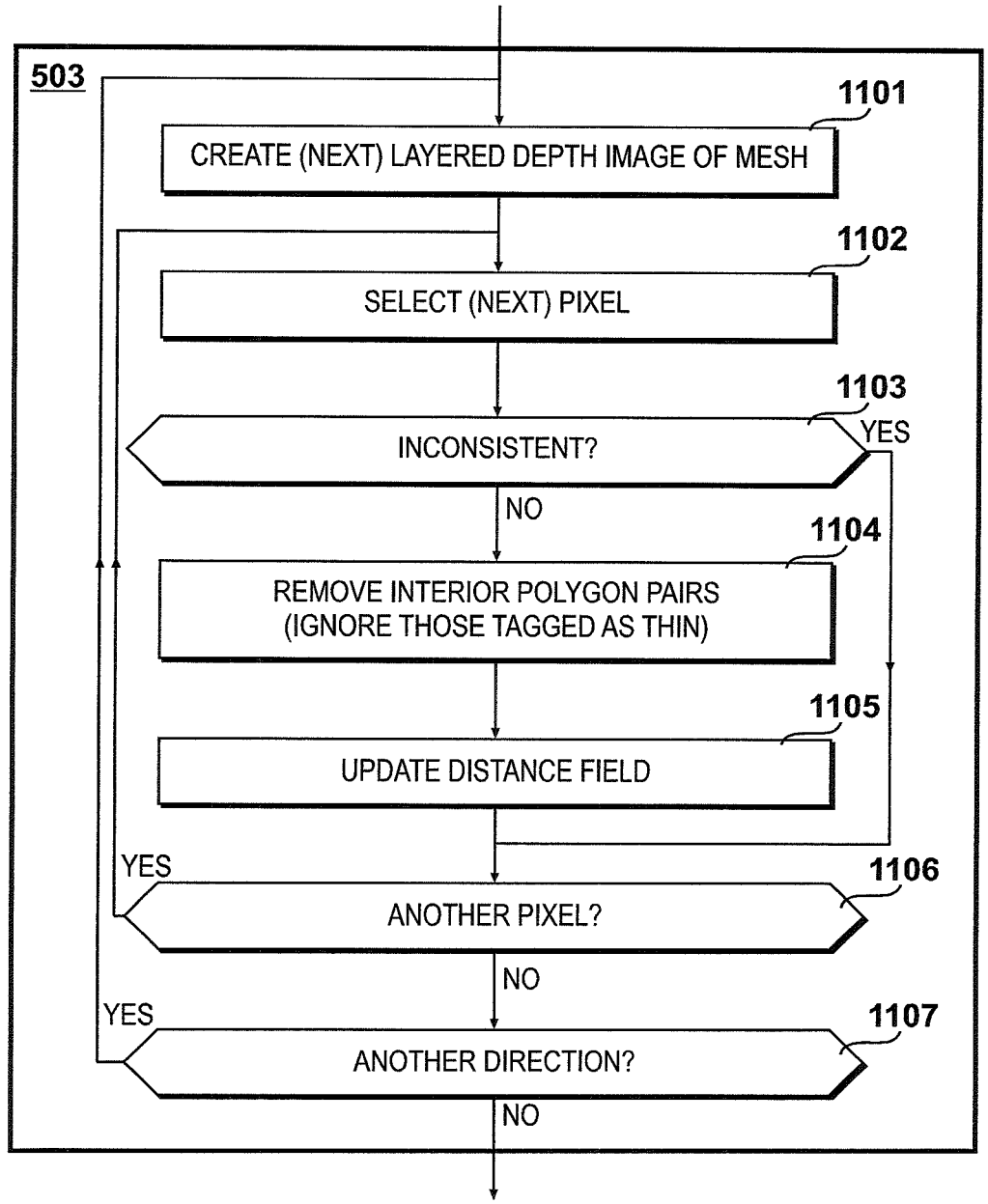
FIG. 11 shows procedures carried out to update the distance field during step 503.

Procedures carried out to update the distance field during step 503 are set out in FIG. 11.

At step 1101, a layered depth image is created from one of the thirteen defined directions, this time recording in the list whether the polygon is tagged as thin or not. The first pixel is then selected for analysis at step 1002, and at step 1103 a question is asked as to whether the pixel's list is inconsistent. Determination of whether a list is inconsistent will be described with reference to FIG. 12. If answered in the negative, then control proceeds to step 1104 whereupon any interior polygon pairs in the list are removed (ignoring those tagged as thin). This is performed by identifying intersection pairs have orientations of +1 and −1 nested within outer pairs themselves having orientations of +1 and −1. The distance field is written to at step 1105, assuming certain conditions are met, which will be described further with reference to FIG. 13.

Then, or if the question asked at step 1103 was answered in the affirmative, to the effect that the list was inconsistent, a question is asked at step 1106 as to whether there is another pixel in the current LDI to consider. If so, control returns to step 1102 until all pixels have been processed whereupon a question will be asked at step 1107 as to whether there is another direction to consider. If so, control returns to step 1101 until again the loop has been completed, in the present case, thirteen times.

FIG. 12

Figure 12:
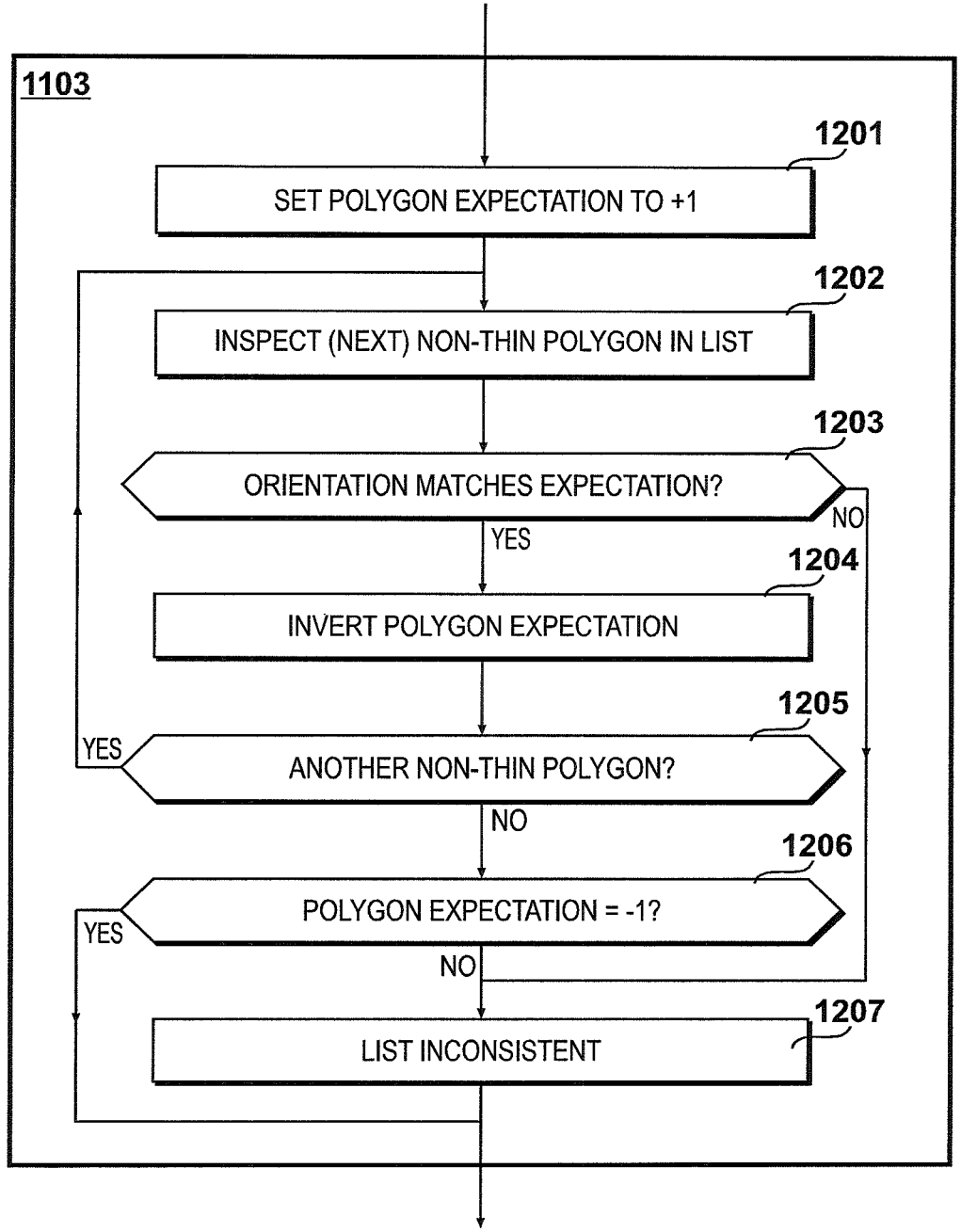
FIG. 12 shows procedures carried out to determine whether a list is inconsistent during step 1103.

Procedures carried out to determine whether a list is inconsistent during step 1103 are set out in FIG. 12.

At step 1201, a variable representing the expected polygon orientation in the list is set to +1 (i.e. oriented against the ray). The next non-thin-tagged polygon in the list is then inspected at step 1202, and its orientation is compared to the expected orientation at step 1203. If the orientation is as expected, no action is taken and so at step 1204 the expected orientation is inverted. A question is asked at step 1205 as to whether there is another non-thin polygon, and if so control returns to step 1202 until all non-thin polygons in the list have been considered. Thus, when the question asked at step 1205 is answered in the negative, it is followed by a question at step 1206 as to the current value of the polygon expectation. If it is equal to −1, to the effect that the last-considered polygon was directed against the ray, then the list is consistent and control proceeds to step 1104. This would be the case with list 803.

Alternatively, should the question asked at step 1203 have been answered in the negative, or the polygon expectation remained positive after considering all polygons, then the list is deemed inconsistent at step 1207 resulting in its processing ceasing. This would be the case with list 806.

Thus, pixels and their lists are considered inconsistent if a polygon of one orientation does not have a corresponding polygon of an opposing orientation.

FIG. 13

Figure 13:
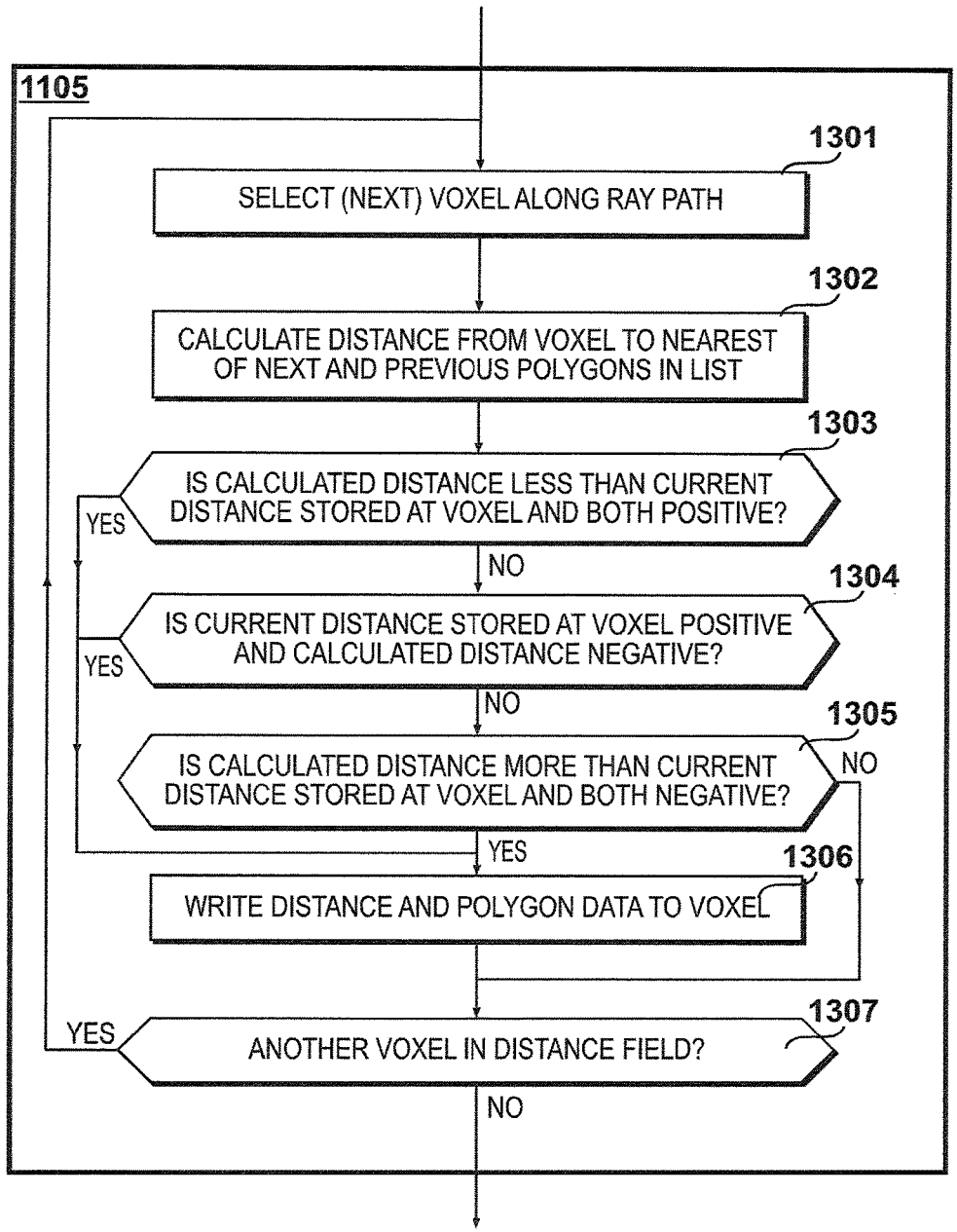
FIG. 13 shows procedures carried out to write to the distance field during step 1105.

Procedures carried out to write to the distance field during step 1105 are set out in FIG. 13.

At step 1301, the first voxel along the currently being considered ray's path is selected. This is preferably made simpler by generating LDIs with the same resolution as the voxel grid. At step 1302, the signed distance from the voxel to the nearest of the next and the previous polygons in the ray's list is calculated. A question is then asked at step 1303, as to whether this calculated signed distance value is less than the current signed distance stored at the voxel, and if both are positive. If not, then another question is asked at step 1304 as to whether the current signed distance stored at the voxel is positive, and whether the calculated distance is negative. If not, then a question is asked at step 1305 as to whether the calculated distance is more (i.e. closer to zero) than the current distance stored at the voxel, and whether both are negative. If so, or if either the question asked at step 1304 or 1305 were answered in the affirmative, then at step 1306 the calculated distance is written to the voxel along with the various other parameters such as the polygon identifier, the barycentric co-ordinates of the nearest point on the polygon, and whether the polygon is tagged thin etc.

Then, or if the question asked at step 1305 was answered in the negative, to the effect that the voxel should not have been updated, a question is asked at step 1307 if there is another voxel in the distance field through which the ray will pass. If so, then control proceeds to step 1301 until all affected voxels have been considered. Step 1105 is then complete.

FIG. 14

Figure 14:
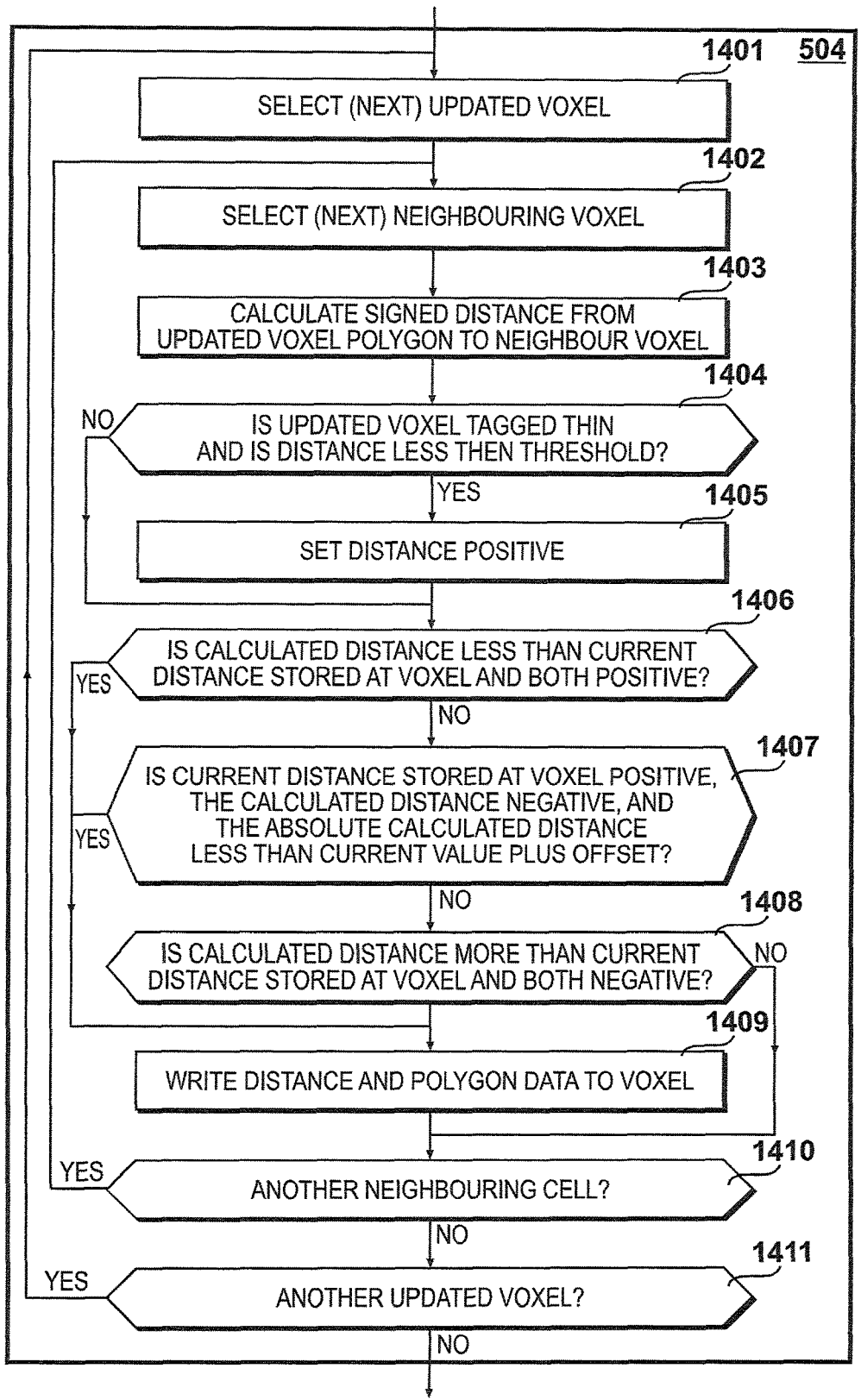
FIG. 14 shows procedures carried out to propagate changes through the distance field during step 504.

Procedures carried out to propagate changes through the distance field during step 504 are set out in FIG. 14.

It is possible that some rays will never pass through the mesh during the creation of the layered depth images, or that they will only pass through thin triangles and so never cause an update to the distance field. This in turn means that some voxels may not be updated at all, or alternatively contain less than accurate values.

Thus, the present invention employs a flood-type algorithm to propagate changes through the distance field. At step 1401, a voxel that was updated at step 1306 or on a previous iteration of step 504 itself is selected. One if its eight neighboring voxels is then selected at step 1402 and the signed distance from the updated voxel's nearest polygon to the neighboring voxel is calculated at step 1403. A question is asked at step 1404 as to whether the voxel that was updated was tagged as thin at step 1306, and if the distance calculated at step 1403 is less than a threshold value (currently a tenth of the distance between voxels). If so, then the calculated distance is forced to be positive at step 1405

Control then proceeds to step 1406, whereupon a question is asked as to whether the calculated signed distance is less than the neighboring voxel's current distance, and whether both are positive. If not, then another question is asked at step 1407 as to whether the current distance stored at the voxel is positive, and whether the calculated distance is negative. If not, then a question is asked at step 1408 as to whether the calculated distance is more (i.e. closer to zero) than the current distance stored at the voxel, whether both are negative, and if the absolute value of the calculated distance is less than the current value plus an offset of, in the present embodiment, one one-thousandth of the distance between voxels.

If so, or if either the question asked at step 1406 or 1407 were answered in the affirmative, then at step 1409 the calculated distance is written to the voxel along with, again, the various other parameters such as the polygon identifier, the barycentric co-ordinates of the nearest point on the polygon, and whether the polygon is tagged thin etc.

The forcing of the calculated signed distance to be positive at step 1405 ensures that degenerate single-polygon features are given a finite thickness in this procedure.

At step 1410 a question is asked as to whether there is another neighboring cell, and if so the aforesaid procedure is repeated until all neighboring cells have been considered. Steps 1401 to 1410 are then repeated by the asking of a question as to whether there is another updated voxel to consider at step 1411, until all voxels become stationary.

When the voxel values become stationary, it is guaranteed using this method that the distance field represents an implicit description of an orientable manifold. Thus, any degeneracies are removed by this process, allowing the object to be printed.

FIG. 15

Figure 15:
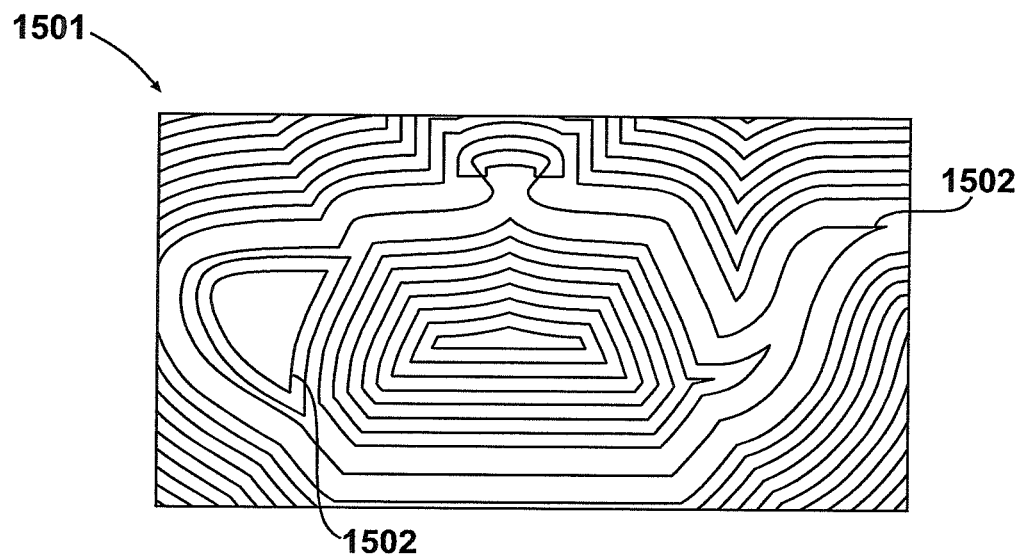
FIG. 15 shows a vertical slice through the distance field representation of the mesh 101 following application of step 402.

A vertical slice through the distance field representation of the mesh 101 following application of step 402 is shown in FIG. 15. The distance field 1501 identifies a surface 1502 defining the mesh. Lines of constant distance in the distance field are shown.

FIG. 16

Figure 16:
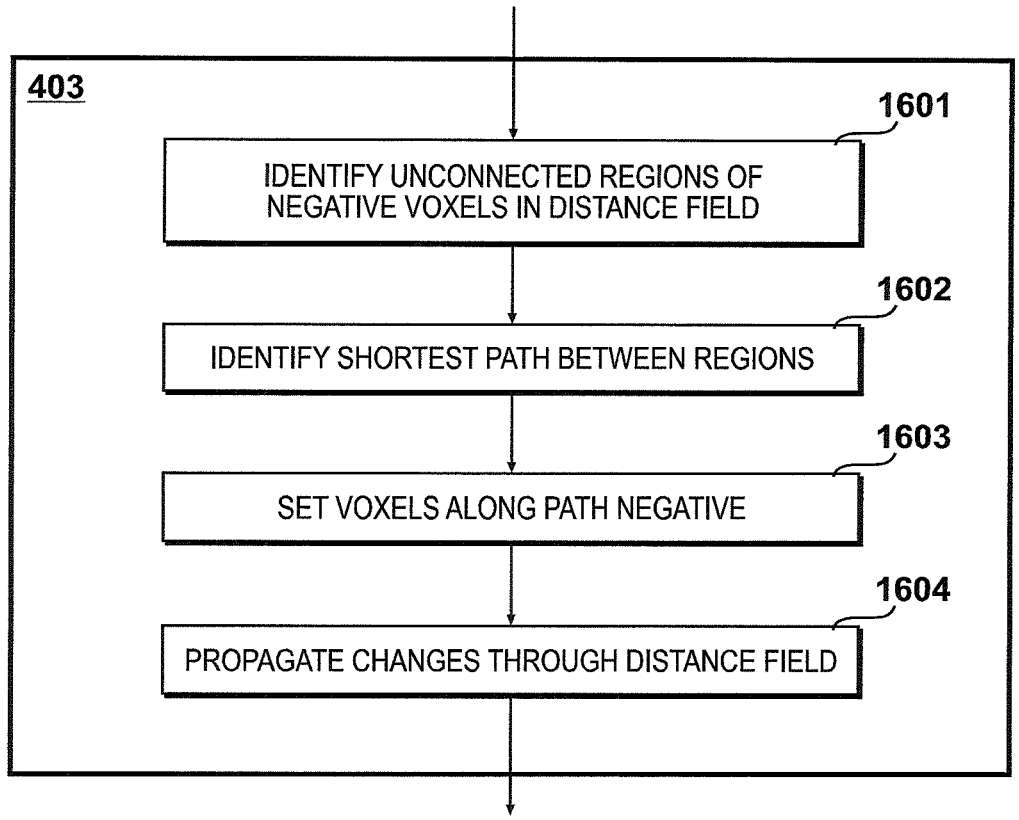
FIG. 16 shows procedures undertaken to join separate components in the distance field during step 403.

Procedures undertaken to join separate components in the distance field during step 403 are set out in FIG. 16.

At step 1601, unconnected regions of negative-valued voxels are identified in the distance field. This is achieved in an embodiment by treating the voxel grid as a graph and testing whether there is a spanning tree for each negative-valued voxel. If not, then there are unconnected regions.

At step 1602, the shortest path between adjacent unconnected regions is identified, again using graph techniques in the present implementation. Currently, Dijkstra's algorithm is used to identify the shortest path between the outer surfaces of the disconnected regions. Voxels along the path are then set negative at step 1603 (i.e. inside the outer surface) with changes propagated through the distance field at step 1604 using the propagate routine of step 504.

FIG. 17

Figure 17:
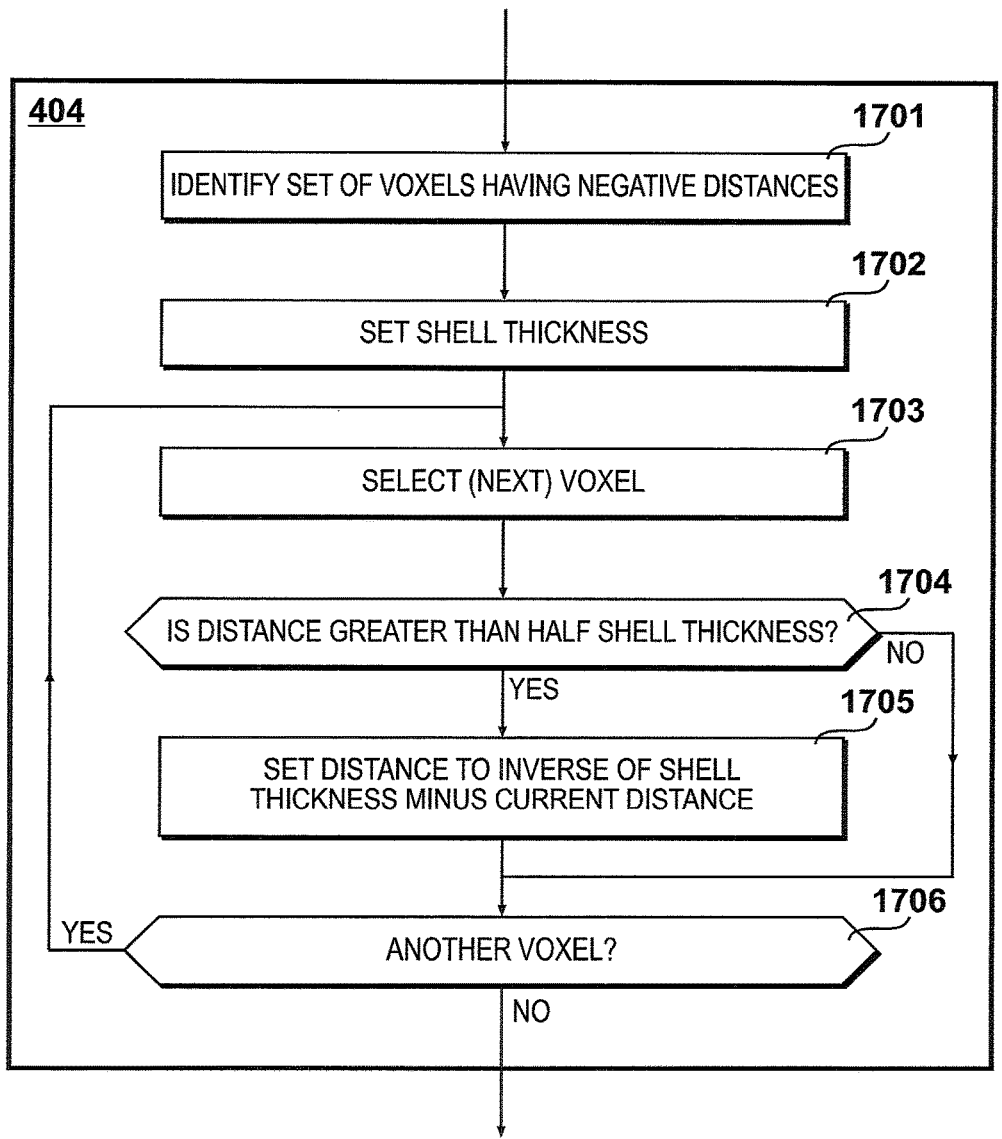
FIG. 17 shows procedures undertaken to form a shell during step 404.

Procedures undertaken to form a shell during step 404 are set out in FIG. 17.

At step 1701, the set of all voxels having negative distances in the distance field is identified, and at step 1702 the desired shell thickness is set. In the present embodiment, the shell thickness is expressed in terms relative to the voxel grid, and is set to be equivalent to around 5 millimeters when printed.

At step 1703, a voxel in the set identified at step 1701 is selected, and at step 1704 a question is asked as to whether the voxel's distance from its polygon is greater than half the desired shell thickness. If so, the distance is set to the inverse of the shell thickness minus the voxel's current distance at step 1705. This means that voxels along what is to become the inner surface of the shell will have values of zero, and voxels outside of the inner surface (i.e. inside the shell) will have positive values. Then, or if the question asked at step 1704 is answered in the negative, control proceeds to step 1706 where a question is asked as to whether there is another voxel to consider. Steps 1703 to 1706 therefore loop until all voxels previously inside what is now the outer surface of the object represented in the distance field have been changed.

It will be appreciated that certain objects that may be printed may well stand upright, but others may need appropriate modification to prevent them falling over. Thus, in the present embodiment, a balancing process is carried out by editing the shell to move the center of mass over the portion of the model intended to be at the bottom. This procedure is set out in the paper R. Prévost, E. Whiting, S. Lefebvre and O. Sorkine-Hornung, "Make it stand: balancing shapes for 3D fabrication", *ACM Trans. Graph.*, vol. 32, no. 4, p. 1, 2013, the whole contents of which are incorporated herein by reference in their entirety.

FIG. 18

Figure 18:
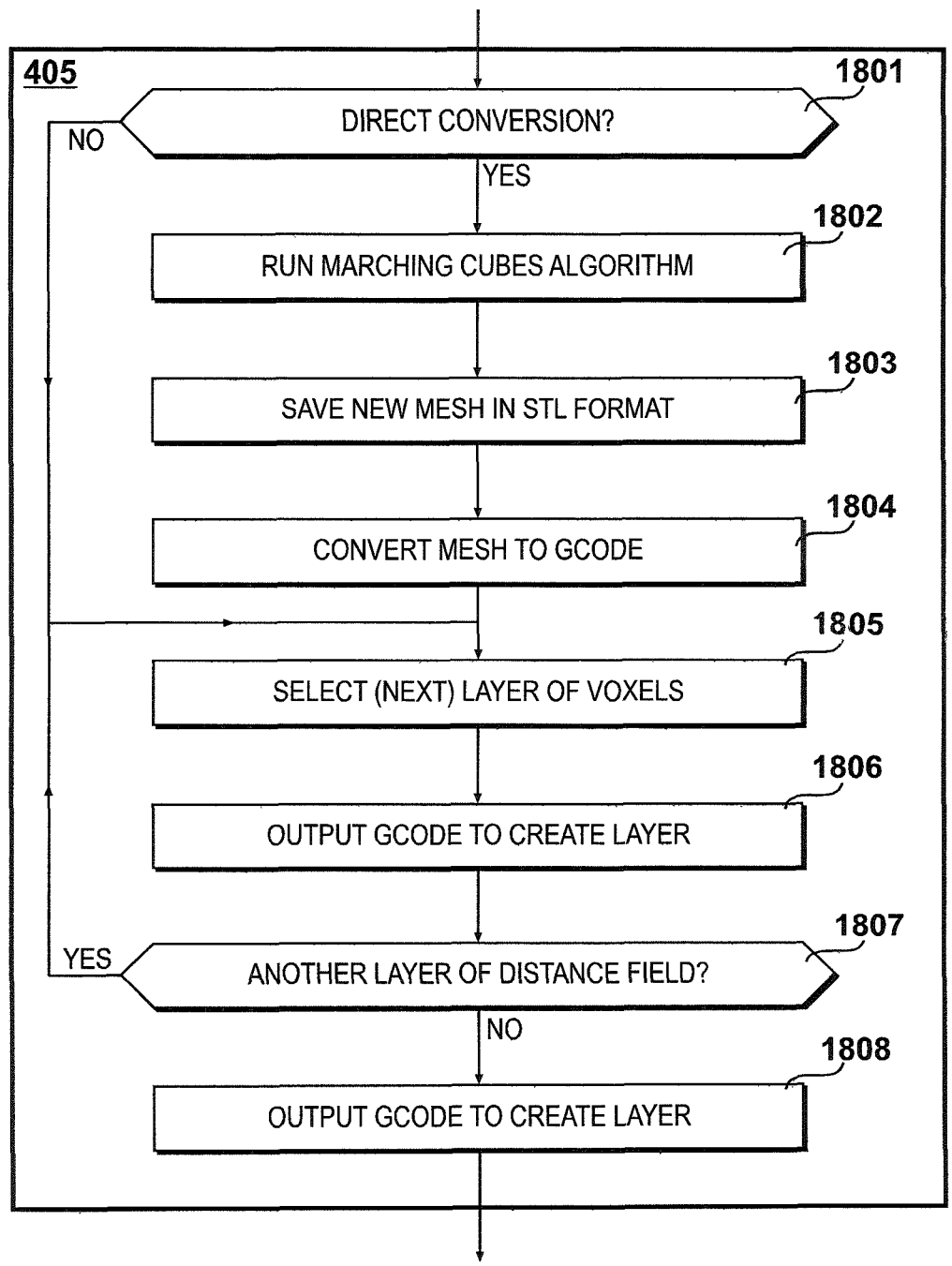
FIG. 18 shows procedures performed to export a model during step 405.

Finally, step 405 in which the model is exported is carried out. Procedures performed during this step are set out in FIG. 18.

At step 1801, a question is asked as to whether a direct conversion is possible. This question takes into account the target printer, which may or may not allow user-generation of GCode, which is the numerical control language used for many additive manufacturing processes.

Thus, if direct conversion is not allowed, the known marching cubes algorithm is invoked at step 1802 to convert the distance field into a new mesh. An array of 256 possible polygon configurations is provided. The algorithm proceeds through the distance field, considering eight neighboring voxels at a time, and then determines the polygon(s) needed to represent the part of the model's surface that passes through volume. The individual polygons are then fused into the desired surface. Each polygon in the new mesh is given the attributes from the distance field, and therefore inherits all of the material type, texture map, normal map, color and lighting information from the original model. This is important as new print technologies are envisaged which may be able to print with multiple materials, including transparent materials.

The new mesh is then saved in the present embodiment in an STL file format at step 1803, after which it is converted to GCode in step 1804 using a utility for such conversion of the known type. The export of the model suitable for printing is then complete.

If direct conversion is allowed, then control proceeds to step 1805 from step 1801, where a horizontal layer of voxels in the distance field is selected. GCode is directly created from the layer of voxels, using direct fitting of line segments and arc paths to the current layer under consideration at step 1806. This process is repeated by the asking of a question at step 1807 as to whether any more layers of the distance field exists, until all have been considered and the GCode for each layer is merged to a complete program at step 1808.

FIG. 19

Figure 19:
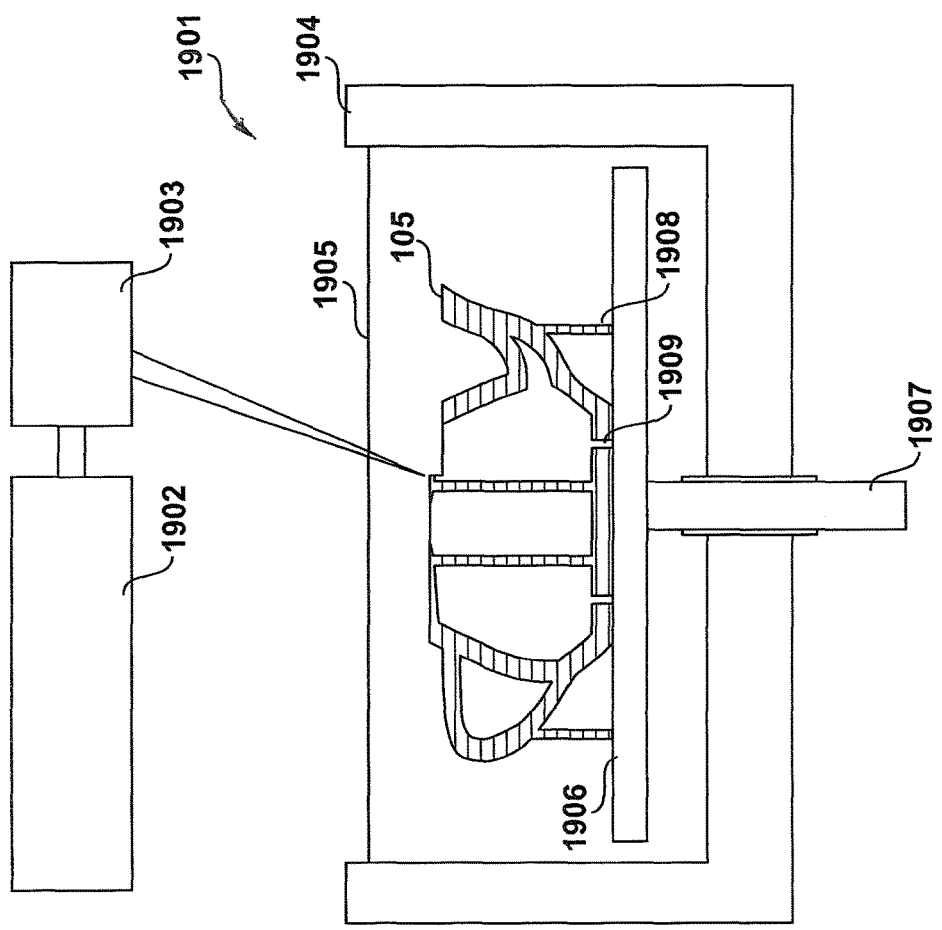
FIG. 19 shows object 105 during the printing phase.

Finished object 105 is shown during the printing phase in FIG. 19, following the processing of the mesh 101 through the steps described hereinbefore. In this example, the object 105 is being printed by a stereolithography apparatus 1901, comprising a laser 1902, a scanner system 1903 and a container 1904 for liquid resin 1905. A platform 1906 is provided in the container 1904, which is lowered by a piston for each new layer added to the object. Support structures 1908 and holes 1909 are provided in the model, added in the present example automatically by the stereolithography apparatus 1901 during its pre-flight checks in the known manner. The external supports can be removed after printing, and the holes filled in to create the finished object.

FIG. 20

Figure 20:
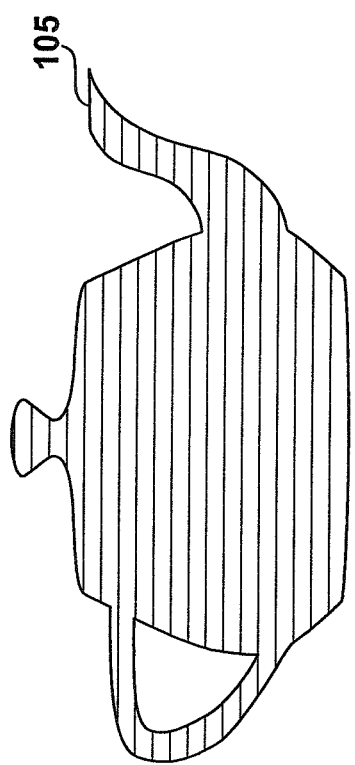
FIG. 20 shows object 105 after printing has been completed.

The printed object 105 is shown in FIG. 20 following the completion of printing by the stereolithography apparatus 1901 and the manual removal of the support structures 1908.

It is envisaged that the present invention is not limited to the conversion of assets from games running locally, but could be used to allow the 3D printing of objects in video streams. By capturing the animation of 3D models during capture of a film, possibly of a game being played or alternatively a computer-animated film, and by knowing the time index of the point at which a user wishes to print an asset, it is possible to import that model data into the processing stage of the present invention for production of 3D printed objects. If all assets are captured, then the printing of an entire scene becomes possible by converting it into one single mesh.

It is also possible to stream 3D data for rendering on the local playback device, with printing enabled for certain models in a scene which is being rendered to 2D video. 3D video for virtual reality head-mounted displays can also be rendered, enabling applications in which 3D models are generated in a virtual environment by a user using a head-mounted display and then printed in real life.

The creation of the distance field as described herein also has applications for scene compression for such local video rendering and also remote play, etc. as the only data that needs to be sent is the list of 3D primitives which fit the distance field following application of the marching cubes algorithm, rather than the distance field or the mesh itself. Alternative algorithms for fitting primitives to the distance field may be employed, and it is envisaged that more complex primitives may be fitted to the isosurfaces in the field including curved surfaces such as (partial) spheres, tori, arcs, etc. This in turn also allows transformation of the models represented in the distance field post-initial capture, allowing animation.

The invention claimed is:

1. A computer-implemented method of preparing a polygon mesh for printing by a process of additive manufacturing, comprising the steps of:

receiving a model of an object to be printed in the form of a polygon mesh;

converting the polygon mesh into a signed distance field comprising voxels identified as interior or exterior to the object, including the steps of creating a plurality of layered depth images of the model, and writing to the distance field using said layered depth images, said conversion including resolving degeneracies in the model so that the signed distance field defines an outer surface that is an orientable manifold, in that pixels in said layered depth images that have inconsistencies are not written to the distance field, and pixels are considered inconsistent if a polygon of one orientation does not have a corresponding polygon of an opposing orientation; and converting the signed distance field to a format that facilitates additive manufacturing of the object.

2. The computer-implemented method of claim 1, further comprising a step of modifying the signed distance field to define an inner surface that is an orientable manifold inside the outer surface, thereby making the object into a hollow shell.

3. The computer-implemented method of claim 2, in which the conversion to a format to facilitate additive manufacturing comprises converting the shell from the signed distance field to a triangle mesh using the Marching Cubes algorithm, which is then converted to said format that facilitates additive manufacturing.

4. The computer-implemented method of claim 2, in which the conversion to a format to facilitate additive manufacturing comprises converting the shell directly from the signed distance field to said format that facilitates additive manufacturing.

5. The computer-implemented method of claim 1, in which
each layered depth image of the model is created by the steps of:
identifying an orientation of said model,
casting a plurality of rays through said model in the direction of said orientation, and for each said ray:
identifying the points at which said ray intersects with said model, and
for each said point, identifying the distance along said ray to said point, and identifying whether the surface of said model at said point is outward or inward facing.

6. The computer-implemented method of claim 1, in which the conversion into the signed distance field further comprises:
identifying disjoint closed surfaces; and
performing a join operation to link the closed surfaces.

7. The computer-implemented method of claim 6, in which the join operation is performed by:
searching for the shortest path between the closed surfaces; and
modifying the distance field to define voxels along the shortest path as interior to the object.

8. The computer-implemented method of claim 1, further comprising a step of instructing a 3D printer to perform additive manufacturing of the object after conversion.

9. Apparatus for preparing a polygon mesh for printing by a process of additive manufacturing, the apparatus having a processor configured to perform steps of:
receiving a model of an object to be printed in the form of a polygon mesh;
converting the polygon mesh into a signed distance field comprising voxels identified as interior or exterior to the object, including the steps of creating a plurality of layered depth images of the model, and writing to the distance field using said layered depth images,
said conversion including resolving degeneracies in the model so that the signed distance field defines an outer surface that is an orientable manifold, in that pixels in said layered depth images that have inconsistencies are not written to the distance field, and pixels are considered inconsistent if a polygon of one orientation does not have a corresponding polygon of an opposing orientation; and
converting the signed distance field to a format to facilitate additive manufacturing of the object.

10. The apparatus of claim 9, in which the processor is further configured to perform a step of modifying the signed distance field so that it defines an inner surface that is an orientable manifold inside the outer surface, thereby making the object into a hollow shell.

11. The apparatus of claim 9, in which
each layered depth image of the model is created by the steps of:
identifying an orientation of said model,
casting a plurality of rays through said model in the direction of said orientation, and for each said ray:
identifying the points at which said ray intersects with said model, and
for each said point, identifying the distance along said ray to said point, and identifying whether the surface of said model at said point is outward or inward facing.

12. The apparatus of claim 9, in which the processor is configured to, during the conversion into the signed distance field, perform steps of:
identifying disjoint closed surfaces; and
performing a join operation to link the closed surfaces.

13. The apparatus of claim 9, in which the processor is further configured to instruct a 3D printer connected to the apparatus to perform additive manufacturing of the object after conversion.

14. A non-transitory computer-readable medium encoded with computer-readable instructions executable by a computer, which, when executed by the computer, cause the computer to perform a method of preparing a polygon mesh for printing by a process of additive manufacturing, comprising the steps of:
receiving a model of an object to be printed in the form of a polygon mesh;
converting the polygon mesh into a signed distance field comprising voxels identified as interior or exterior to the object, including the steps of creating a plurality of layered depth images of the model, and writing to the distance field using said layered depth images,
said conversion including resolving degeneracies in the model so that the signed distance field defines an outer surface that is an orientable manifold, in that pixels in said layered depth images that have inconsistencies are not written to the distance field, and pixels are considered inconsistent if a polygon of one orientation does not have a corresponding polygon of an opposing orientation; and
converting the signed distance field to a format that facilitates additive manufacturing of the object.

15. The non-transitory computer-readable medium of claim 14, further comprising a step of modifying the signed distance field to define at least one inner surface that is an orientable manifold, thereby making the object into a hollow shell.

16. The non-transitory computer-readable medium of claim 14, in which
each layered depth image of the model is created by the steps of:
identifying an orientation of said model,
casting a plurality of rays through said model in the direction of said orientation, and for each said ray:
identifying the points at which said ray intersects with said model, and
for each said point, identifying the distance along said ray to said point, and identifying whether the surface of said model at said point is outward or inward facing.

17. The non-transitory computer-readable medium of claim 14, in which the conversion into the signed distance field further comprises:
  identifying disjoint closed surfaces; and
  performing a join operation to link the closed surfaces.

18. The non-transitory computer-readable medium of claim 14, wherein the method further comprises a step of instructing a 3D printer connected to the computer to perform additive manufacturing of the object after conversion.

* * * * *